W. J. SCHAEDLER.
TANK GAUGE.
APPLICATION FILED JAN. 12, 1921.
1,423,544. Patented July 25, 1922.
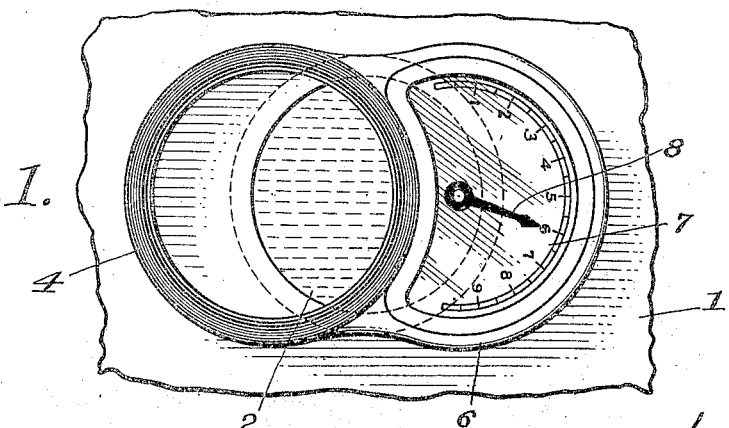
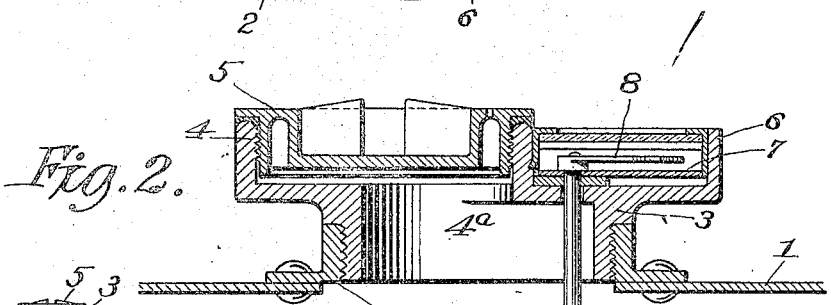
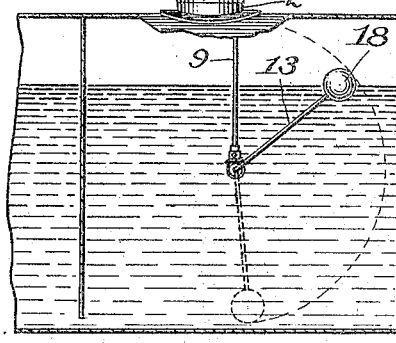
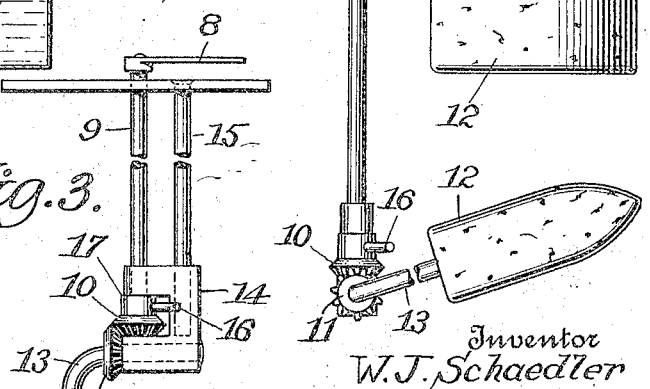
Inventor
W. J. Schaedler
By his Attorneys
Sheffield & Betts.

UNITED STATES PATENT OFFICE.

WILFRED J. SCHAEDLER, OF BROOKLYN, NEW YORK.

TANK GAUGE.

1,423,544.      Specification of Letters Patent.      Patented July 25, 1922.

Application filed January 12, 1921. Serial No. 436,690.

*To all whom it may concern:*

Be it known that I, WILFRED J. SCHAEDLER, a citizen of the United States, residing at 234 Stanhope Street, in the borough of Brooklyn, city of New York, and State of New York, have invented certain new and useful Improvements in Tank Gauges, of which the following is a description.

My invention relates to devices for indicating the level of liquids in tanks and the like and is designed more particularly for use in connection with the gasoline tanks of automobiles of the Ford type.

The principal object of my invention is to provide a liquid level indicator of maximum simplicity, but of a high degree of accuracy under service conditions.

The second object of my invention is to provide a trustworthy level indicator for liquids which may be used with a normally closed tank and which shall not require more than the ordinary filling aperture to be made in a tank body, nor removal when filling the tank.

The novel features of my invention are pointed out with particularity in the appended claims. The invention itself, however, together with further objects and advantages, will best be understood from the following description taken in connection with the appended drawing in which—

Fig. 1 is a top plan view of the filling aperture of a gasoline tank of the Ford type having my invention applied thereto.

Fig. 2 is a vertical sectional view of the parts shown in Fig. 1.

Fig. 3 is an elevational view taken at right angles to Fig. 2, illustrating the operating parts of the level indicator appearing in Fig. 2.

Fig. 4 is a plan view of the float illustrated in Fig. 2.

Fig. 5 is a sectional view partly in elevation of a horizontal cylindrical tank of the Ford type containing gasoline and fitted with an indicator according to my invention, but showing the use of a modified form of float member from that shown in Figs. 2 and 4.

In separate views the same part is designated by the same reference character.

Referring to the drawing in detail, 1 is a cylindrical gasoline tank of the Ford type having a filling aperture at 2. According to my invention, I supply a hollow head 3 which may be secured in the aperture 2 in any suitable manner, the head 3 preferably having an offset screw threaded flange 4 overlapping the space 4ª through which the liquid may be introduced into the tank 1. The flange 4 is preferably of the same size as the aperture 2, so that the ordinary cap 5 may be simply transferred from aperture 2 to mouth formed by the flange 4, when the tank is fitted with my improved gauge. The head 3 also has a semi-circular outer wall 6 forming with the flange 4 a segmental recess adapted to contain a similarly shaped scale 7 and pointer 8 of a tank gauge or liquid level indicator. The pointer 8 is mounted at the upper end of a vertical spindle 9, the lower end of which carries a gear 10 meshing with a second gear 11, to which the float 12 is connected by a rod 13. The lower end of spindle 9 is journaled in a bracket 14 suspended from a head 3 by means of a fixed rod 15. The operating rod 13 is also journaled in the head of bracket 14, the journal for the rod 13 being horizontal and that for the spindle 9 being vertical. The spindle 9 and supporting rod 15 are so placed on the rod 13 that they extend downward into the tank through the central filling space 4ª, thus rendering it unnecessary to provide any additional opening through the tank body or wall when applying my invention thereto. The rod 15 and spindle 9 preferably are of sufficient length so that the axis of the float member is practically at the mid-height of the tank. By this arrangement, I obtain a maximum angular movement of the float and also, in case of the usual cylindrical tank, I am able to use a scale having approximately equal scale divisions, the increased difference in liquid level per gallon of liquid in the lower and upper portions of the tank, compensating to a large extent for the decrease in angle between rod 13 and the liquid surface. It will be seen, also, that the large angle of movement of the float member permits me to use a long scale with one to one gearing.

In order to prevent the float from rising in such direction as to turn the pointer the wrong way of the scale, I provide a stop pin 16, which I prefer to fix in the collar 17 of the gear 10 in such manner that it will contact with bracket 14 to prevent the rod 13 from passing to the other side of the vertical from that illustrated in Fig. 5.

The float member 12 is illustrated as being of cork, and such material forms a suitable member, especially when treated with varnish or other material to prevent the float from absorbing gasoline. I may, however, use a hollow metal float such as 18 (Fig. 5) when desired.

It will be seen that I have provided a liquid gauge of great simplicity and convenience in use. A gauge according to my invention may also be made very cheaply and maintains its accuracy under ordinary conditions of usage.

While I have illustrated and described the preferred embodiment of my invention, I do not wish to be limited to details of form, constructions or arrangement herein disclosed, except as such may be essential to the validity of the appended claims.

Having thus described my invention, I claim:

1. A liquid gauge comprising, in combination, a hollow head having a filling passage therethrough and adapted to be fixed in a filling opening in the top of a tank, an indicator portion carried by said head, a supporting rod depending from said head, a bracket fixed to the lower end of said supporting rod, a float member, a rod carrying said float member, said rod having a lateral portion journalled in said bracket about midway between the top and bottom of the tank so that said float member is adapted to swing through an angle of substantially 180 degrees, a vertical spindle journalled at its lower end in said bracket, a pointer fixed to the upper end of said spindle and working in the indicator portion of said head, and gears connecting said float-carrying rod and said vertical spindle.

2. A liquid gauge comprising, in combination, a hollow head having a filling passage therethrough and adapted to be removably held within the usual filling opening in the top of a tank, an indicator portion carried by said head and having a scale thereon, a supporting rod carried by said head and adapted to extend downward into said tank to a point equally distant between the top and bottom thereof, a U-shaped bearing carried on the lower end of said rod, a vertical indicator spindle parallel to said rod and having a bearing in one arm of said bearing member, a float rod pivoted in the other arm of said bearing member and carrying a gear adjacent said arm, a gear on said indicator spindle between said arms, a pointer on the upper end of said indicator spindle, and a float on the outer end of said float rod.

WILFRED J. SCHAEDLER.